(12) United States Patent
Ramarathnam et al.

(10) Patent No.: US 12,030,415 B2
(45) Date of Patent: Jul. 9, 2024

(54) VERTICALLY ADJUSTABLE TRAY TABLE

(71) Applicant: Safran Seats USA LLC, Gainesville, TX (US)

(72) Inventors: Gokul Ramarathnam, Irvine, CA (US); Reza Mansouri, Costa Mesa, CA (US)

(73) Assignee: Safran Seats USA LLC, Gainesville, TX (US)

( * ) Notice: Subject to any disclaimer, the term of this patent is extended or adjusted under 35 U.S.C. 154(b) by 208 days.

(21) Appl. No.: 17/630,359

(22) PCT Filed: Jul. 31, 2019

(86) PCT No.: PCT/US2019/044417
§ 371 (c)(1),
(2) Date: Jan. 26, 2022

(87) PCT Pub. No.: WO2021/021170
PCT Pub. Date: Feb. 4, 2021

(65) Prior Publication Data
US 2022/0267010 A1 Aug. 25, 2022

(51) Int. Cl.
*B60N 3/00* (2006.01)
*A47C 7/68* (2006.01)
(Continued)

(52) U.S. Cl.
CPC ............. *B60N 3/004* (2013.01); *A47C 7/68* (2013.01); *A47C 7/70* (2013.01); *A47C 7/705* (2018.08);
(Continued)

(58) Field of Classification Search
CPC ........ B60N 3/001; B60N 3/002; B60N 3/004; B64D 11/0368; A47B 21/02;
(Continued)

(56) References Cited

U.S. PATENT DOCUMENTS 1,809,866 A * 6/1931 Riesche ................... A47B 5/04
108/134
2,056,078 A * 9/1936 Slater ..................... A47B 57/34
108/107
(Continued)

FOREIGN PATENT DOCUMENTS

CN 104827937 A 8/2015
FR 2639198 A2 5/1990

OTHER PUBLICATIONS

International Patent Application No. PCT/US2019/044417, International Search Report and Written Opinion, dated Apr. 30, 2020.

*Primary Examiner* — Robert Canfield
(74) *Attorney, Agent, or Firm* — Kilpatrick Townsend & Stockton LLP (57) ABSTRACT

Described are support surfaces (such as passenger seat tray tables) that have a pivot about which the support surface is rotatable. The pivot can be coupled with a track and movable relative to the track to adjust a deployed height of the tray table, such as among a stowed position along the seat back in which the pivot is retained at a first height; a first deployed position in which the pivot is retained at a first height and the support surface is oriented for receiving and supporting items; and a second deployed position in which the pivot is retained at the second height and the support surface is oriented for receiving and supporting items.

11 Claims, 10 Drawing Sheets

(51) Int. Cl.
    *A47C 7/70*           (2006.01)
    *B64D 11/06*         (2006.01)

(52) U.S. Cl.
    CPC .............. *B60N 3/001* (2013.01); *B60N 3/002* (2013.01); *B64D 11/0638* (2014.12)

(58) Field of Classification Search
    CPC .... A47B 2021/0321; A47B 2021/0335; A47B 9/06; A47B 9/14; A47B 9/20; A47B 5/04; A47C 7/68; A47C 7/70; A47C 7/705
    USPC ................................ 108/42, 44, 144.11, 146
    See application file for complete search history.

(56) References Cited

U.S. PATENT DOCUMENTS

| | | | | |
|---|---|---|---|---|
| 2,168,210 | A | 8/1939 | Hawksley | |
| 2,619,395 | A * | 11/1952 | Kent | B60N 3/004 297/146 |
| 3,185,113 | A * | 5/1965 | Nathan | A47C 7/705 108/18 |
| 3,985,374 | A * | 10/1976 | Powaska | B60N 3/004 248/240.4 |
| 4,519,648 | A * | 5/1985 | Jovanovic | B60N 3/004 403/92 |
| 4,605,131 | A * | 8/1986 | Debus | A47B 5/04 108/134 |
| 5,370,060 | A | 12/1994 | Wang | |
| 5,381,738 | A * | 1/1995 | Meyer | A47B 5/00 108/42 |
| 5,467,721 | A * | 11/1995 | Gosch | A47B 9/06 108/146 |
| 5,479,852 | A * | 1/1996 | Lloyd | A47B 9/14 108/146 |
| 5,765,911 | A * | 6/1998 | Sorenson | A47C 7/70 297/161 |
| 5,947,033 | A * | 9/1999 | Lombardo | B60N 3/004 297/163 |
| 6,148,738 | A * | 11/2000 | Richter | B60N 3/005 108/47 |
| 6,679,188 | B1 * | 1/2004 | Spagnoli, Jr. | B60N 3/004 108/44 |
| 6,805,403 | B2 * | 10/2004 | Buch | B60N 3/004 297/188.05 |
| 6,807,690 | B1 * | 10/2004 | Satterfield | A47K 3/282 297/14 |
| 7,309,051 | B2 * | 12/2007 | McNeill | A47B 9/14 108/147.11 |
| 7,862,112 | B2 | 1/2011 | Caturla et al. | |
| 8,205,564 | B2 * | 6/2012 | St. Louis | B64D 11/06 108/147 |
| 8,567,325 | B1 * | 10/2013 | Hlatky | A47B 9/14 108/134 |
| 8,584,601 | B1 * | 11/2013 | Deschner | B25H 1/04 108/134 |
| 8,671,598 | B2 * | 3/2014 | Murphy | D06F 81/06 38/104 |
| 9,511,694 | B2 * | 12/2016 | Mendicino | B60N 2/767 |
| 9,820,564 | B2 * | 11/2017 | Mullins | A47B 5/04 |
| 10,131,284 | B2 * | 11/2018 | Kang | B60R 7/081 |
| 2001/0035114 | A1 * | 11/2001 | Ash | A47B 5/02 108/147 |
| 2005/0274299 | A1 * | 12/2005 | Bienick | F25D 25/02 108/108 |
| 2006/0071510 | A1 * | 4/2006 | Jiang | A47C 9/06 297/14 |
| 2006/0214479 | A1 * | 9/2006 | Dwire | B60N 3/004 297/163 |
| 2008/0092784 | A1 | 4/2008 | Merensky | |
| 2008/0156962 | A1 * | 7/2008 | Chen | A47B 9/14 248/653 |
| 2008/0271649 | A1 * | 11/2008 | Leng | A47B 9/16 108/119 |
| 2009/0277358 | A1 * | 11/2009 | Volpe, Jr. | B60N 3/002 108/44 |
| 2009/0293774 | A1 * | 12/2009 | Cheung | A47B 5/06 74/89.23 |
| 2010/0201163 | A1 * | 8/2010 | Dunkel | B60N 2/995 297/124 |
| 2015/0241041 | A1 * | 8/2015 | Youngberg | A47C 7/68 108/150 |
| 2018/0168334 | A1 * | 6/2018 | Swartz | F16M 11/046 |
| 2018/0339630 | A1 * | 11/2018 | Akaike | B64D 11/0638 |
| 2021/0153645 | A1 * | 5/2021 | Beere | B60N 3/002 |
| 2021/0394906 | A1 * | 12/2021 | Smith | B64D 11/0638 |
| 2022/0041286 | A1 * | 2/2022 | Rebmann | B64D 11/064 |
| 2022/0081117 | A1 * | 3/2022 | Alam | B64D 11/0642 |
| 2022/0194284 | A1 * | 6/2022 | Woerz | B64D 11/0638 |

* cited by examiner

VERTICALLY ADJUSTABLE TRAY TABLE

FIELD OF THE INVENTION

The field of the invention relates to tray table assemblies for passenger vehicles such as aircrafts.

BACKGROUND

Tray tables are widely used in most aircraft seat assemblies. The tray table sub-assembly is typically pivoted on a pair of arms which allows the tray table to swivel between deployed and stowed positions, for example, relative to the back of the aircraft seat. During deployment, the arms commonly rotate a short distance rearward, which supports the pivot for the tray table at a particular position offset from the seat back so that the deployed position of the tray table is unaffected by the recline position of the seatback. The ability of the arms to rotate also allows the tray table to be readily stowed regardless of the seatback recline position. For example, the mobility of the arms can allow the pivoting end of the tray table to be moved to a position adjacent the seatback and allow an opposite, free end of the table to be swiveled upward and secured further up along the seatback, regardless of where the seatback may be within a recline path. In seats without a recline function, the tray table may be pivoted directly from a shroud or other fixed portion of the seat back.

Pivoting the tray table to a deployed position can provide a convenient table for a person sitting in a position facing the rear of the seat, such as a passenger situated aft of a forward-facing seat. When deployed, tray tables may be used as a surface for supporting food, drink, or other items, such as for work or entertainment during travel. The pivoting nature of the tray table may be useful in allowing the tray table to be readily deployed when desired by a seated passenger or readily stowed, such as to facilitate egress or ingress relative to the seat.

However, the tray table when deployed occupies a portion of the passenger's "living space" (e.g., amount of space between the passenger's seat and adjacent seats). Although tray table assemblies are often provided with sliding assemblies that allow the deployed tray table to move forward or backward relative to the pivot (e.g., allowing the passenger to move the tray table closer or further away to adjust living space distribution), the tray table assembly typically is typically fashioned to accommodate a certain range of the population and may lack the ability for ready customization to accommodate individuals in the top or bottom five percentile or other relevant outlier range.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, provided may be a passenger seat, including a seat back, a height-adjustable pivot, and a support surface. The height-adjustable pivot can be adjustable between being retained at a first height relative to the seat back and being retained at a second height relative to the seat back. The support surface can be rotatable about the pivot and adjustable between: a stowed position along the seat back; a first deployed position in which the pivot is retained at the first height and the support surface is oriented for receiving and supporting items; and a second deployed position in which the pivot is retained at the second height and the support surface is oriented for receiving and supporting items.

In some embodiments, the seat back is reclinable. In some embodiments, the seat back is fixed to prevent reclining.

In some embodiments, the passenger seat further includes a pin releasably receivable among a first recess for retaining the pivot at the first height and a second recess for retaining the pivot at the second height.

In some embodiments, the passenger seat further includes: a first prong defining a first notch for retaining the pivot at the first height, and a second prong positioned above the first prong and defining a second notch for retaining the pivot at the second height. The first prong and the second prong may extend aftward. The first prong and the second prong may extend forward.

In some embodiments, the passenger seat further includes a hook at a lower end of the tray table. The passenger seat can also include a first pawl positioned to receive the hook to retain the pivot at the first height. The passenger seat can also include a second pawl positioned above the first pawl and positioned to receive the hook to retain the hook at the second height. In some embodiments, the passenger seat further includes a telescoping arm supporting the pivot and extendable or retractable to move the pivot between the first height and the second height.

According to certain embodiments of the present invention, provided may be a tray table assembly including a tray table having a support surface. The tray table assembly can also include a pivot about which the support surface of the tray table is rotatable. The tray table assembly can also include a track coupled with the pivot, where the pivot is movable relative to the track to adjust a deployed height of the tray table.

In some embodiments, the track is formed in a shroud configured to be coupled to a seat back.

In some embodiments, the track is formed in a tray table arm.

In some embodiments, the arm includes a stock portion extending from a mounting interface of the arm to a first rung for supporting the pivot at a first deployed height. The tray table arm can also include an extension portion extending from the first rung to an extremity of the arm opposite the mounting interface. The extension portion can also include a final rung for supporting the pivot at an uppermost deployed height.

In some embodiments, the tray table assembly further includes a rail spaced apart from the rungs to define gaps through which the pivot is movable for moving between rungs.

According to certain embodiments of the present invention, provided may be a method that includes deploying a tray table from a stowed position along a seat back of a passenger seat and about a pivot of the tray table to a first deployed position in which the pivot of the tray table is structurally retained at a first height and a support surface of the tray table is oriented for receiving and supporting items. The method can also include vertically adjusting the tray table from the first deployed position to a second deployed position in which the pivot of the tray table is structurally retained at a second height different than the first height and the support surface of the tray table is oriented for receiving and supporting items.

In some embodiments, the method further includes disengaging the pivot from a first rung that structurally retains the pivot at the first height. The method can also include engaging the pivot with a second rung that structurally retains the pivot at the second height.

In some embodiments, the method further includes tilting the tray table upward to release a hook at a lower end of the tray table from a first pawl that structurally retains the pivot at the first height. The method can also include vertically moving the pivot. The method can also include tilting the tray table downward to engage the hook with a second pawl that is at a different height from the first pawl and that structurally retains the pivot at the second height.

In some embodiments, the method further includes raising the pivot out of a first notch that structurally retains the pivot at the first height. The method can also include raising the pivot along a ramped surface and past a lip that defines a transition between an upper end of the ramped surface and a second notch. The method can also include lowering the pivot into the second notch to structurally retain the pivot at the second height.

In some embodiments, the method further includes retracting a pin from a first recess that structurally retains the pivot at the first height. The method can also include vertically moving the pivot. The method can also include extending the pin into a second recess that structurally retains the pivot at the second height.

In some embodiments, vertically adjusting the tray table from the first deployed position to the second deployed position includes extending or retracting a telescoping arm in which the pivot is mounted.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide tray table assemblies for passenger seats. While the tray table assemblies are discussed for use with aircraft seats, they are by no means so limited. Rather, embodiments of the tray table assemblies may be used in passenger seats or other seats of any type or otherwise as desired. For example, embodiments may be used on trains, buses, movie theaters, student seating, or any other instance when a tray table on a forward structure may be useful.

In various embodiments, the tray table assemblies can allow a tray table to be moved vertically to adjust a deployed height of the table. For example, in use, a passenger may release the tray table from a stowed position against a seat back and rotate the table down to a first deployed position. From that first deployed position, the passenger may raise or lower the table to a different vertical position. Such adjustability may accommodate passengers that might be outside the typical accommodated size range or that might otherwise find the tray table to be initially deployed at a suboptimal level. For example, a particularly tall passenger might raise the tray table so the table does not rest on the passenger's legs, or a particularly short passenger might lower the table to a more convenient level closer to the passenger's legs. In some examples, raising the table may allow a shift from a height convenient for food to a height convenient for supporting a laptop or other personal device for viewing without excessive neck craning.

Various suitable techniques and/or structures may be implemented to enable such vertical adjustability of the tray table assemblies. In some examples, enabling structures may be included in the seat back (such as in a shroud) or separate from the seatback (such as in a tray table arm). In some examples, push buttons, levers, or other actuators may be manipulated by the passenger to release pins from an initial recess that supports the tray table at a first height and allow the tray table to be raised or lowered to one or more other levels at which the pins may engage other recesses to support the tray table. In some examples, a hook at the pivoting end of the tray table may be rotated or otherwise disengaged from a pawl at one level and re-engaged with another pawl to secure the tray table at another level. In some examples, pivot of the tray table may be lifted out of engagement with one prong (e.g., lifted out of a notch bounded by the prong) and moved vertically before engaging with another prong that can hold the table at a different vertical position. In some examples, tray table arms may be telescoping to permit the tray table to raise or lower between different deployed heights.

According to certain embodiments of the present invention, as shown in FIGS. 1-5, a height-adjustment system 101 can be implemented relative to a passenger seat 103 that includes a seat body 105.

Figure 1:
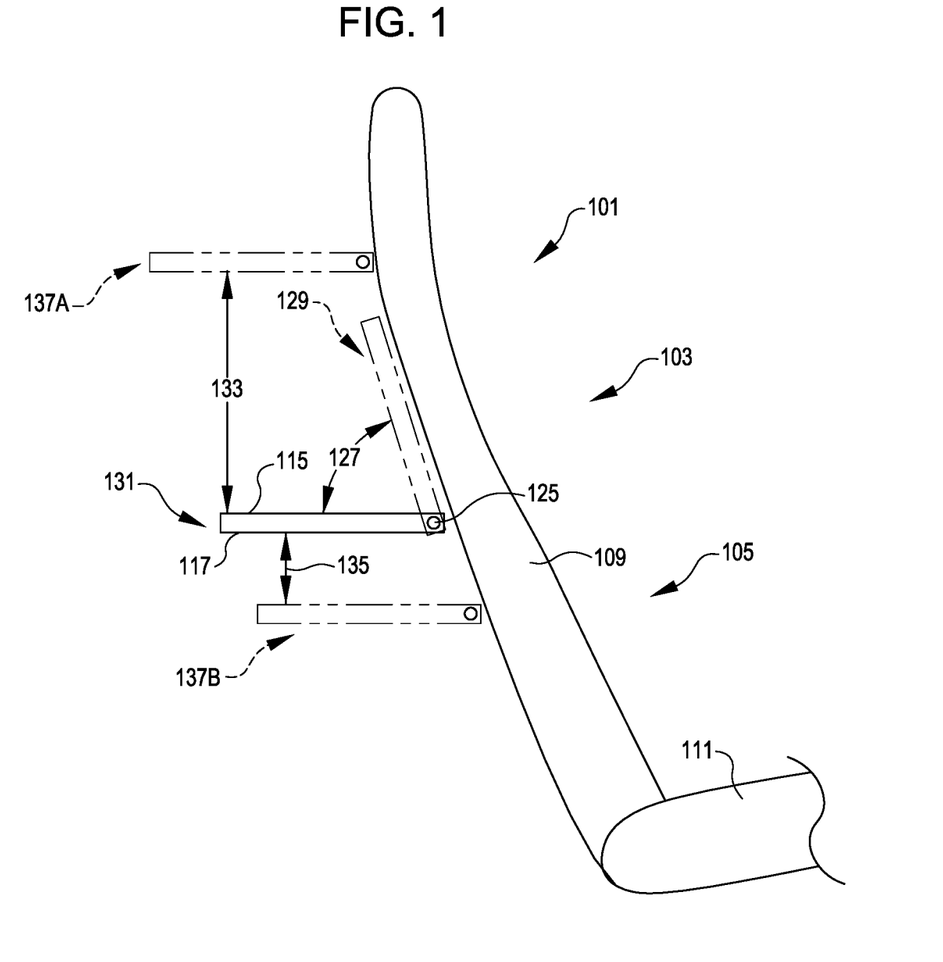
FIG. 1 is a side view of a passenger seat having a height-adjustable tray table, according to certain embodiments of the present invention.

The seat body 105 can include a seat back 109 and a seat pan 111. The seat back 109 and the seat pan 111 may be fixed relative to one another or movable to one another, e.g., to facilitate suitable recline motion if the seat 103 is reclinable. In some examples, the seat back 109 and the seat pan 111 may be single load-bearing structure.

Respective elements of the seat body 105 may include suitable materials and/or features to facilitate various functions. For example, in various embodiments, the seat pan 111 and the front of the seat back 109 include non-rigid or pliable materials (e.g., fabric, textiles, foam, or other cushioning material) for the comfort of passengers when supported in the passenger seat 103. Other more rigid materials may also be included, such as to reinforce pliable materials, or to provide components for other functions. For example, the seat back 109 on a rear side may include a shroud that is formed from rigid material and that is coupled with cushioning material of the seat back 109. Suitable examples of rigid material that may be used for the shroud and/or other components described herein include, but are not limited to, aluminum, stainless steel, aramid fibers, polycarbonate, polypropylene, other metallic materials, composite materials, or other similar materials. The seat back 109 and/or seat pan 111 can include suitable contouring or other features for facilitating passenger comfort.

A support surface 115 may be provided relative to the rear of the seat back 109. For example, the support surface 115 may form a portion of a tray table 117. The illustrated tray table 117 is shown as having a body formed of a single leaf, illustrated as generally rectangular in shape, although other geometries may be used as well. Additionally or alternatively, the tray table 117 can have a body that includes multiple leaves. For example, there may be folding, two-leaf tables.

The support surface 115 may be rotatable about a pivot 125. For example, the support surface 115 may be rotatable (as at arrow 127) or deployable between a stowed position 129 (e.g., in phantom in FIG. 1) and an initial or first deployed position 131 (e.g., in solid lines in FIG. 1). The pivot 125 may correspond to a pin, rod, tube, or any other structure that can facilitate rotation.

In the stowed position 129, the support surface 115 may be received along the seat back 109. Although the support surface 115 in FIG. 1 is shown facing the seat back 109 in the stowed position 129, in some examples, the support surface 115 may face away from the seat back 109 in the stowed position 129. For example, instead of swiveling downward from the stowed position 129 to reach the first deployed position as depicted in FIG. 1, the support surface 115 may swivel upward.

In the first deployed position 131, the support surface 115 can be oriented for receiving and supporting items. For example, the support surface 115 may support a passenger's food, book, magazine, laptop, personal entertainment device, or other items. The support surface 115 may be sufficiently robust to support a passenger's head and/or arms.

Furthermore, in the first deployed position 131, the pivot 125, the support surface 115, and/or the tray table 117 may be structurally retained at a first height relative to the seat back 109. Being structurally retained may correspond to being retained without need for a passenger to hold the item in place or otherwise being retained without human intervention. Any suitable structures may be utilized to structurally retain respective elements, including, but not limited to structures described herein.

The pivot 125 may be height-adjustable. For example, the pivot 125 may move among different vertical positions along the seat back 109. In particular, the pivot 125 may be movable to vertically adjust a deployed height of the support surface 115 and/or tray table 117. Vertically adjusting may correspond to raising (e.g., at arrow 133) or lowering (e.g., as at arrow 135). For example, the support surface 115 may be vertically adjusted to move to from the first deployed position 131 to a second deployed position 137 (such as an upper second deployed position 137A above the first deployed position 131 or a lower second deployed position below the first deployed position 131). In the second deployed position 137, the pivot 125, the support surface 115, and/or the tray table 117 may be structurally retained at a second height relative to the seat back 109, and the support surface 115 can be oriented for receiving and supporting items.

The pivot 125 may be slidingly joined to the seat body 105 or coupled in any other suitable fashion to permit the height-adjustability. In some examples, suitable structure is incorporated into the seat back 109 (e.g., FIG. 1 may correspond to a cross-sectional view of a portion of the seat 103). In some examples, suitable structure is provided in arms or other components that may be distinct from the seat back 109 (e.g., FIG. 1 may correspond to a side view in which such structure is omitted to avoid obscuring other features in FIG. 1).

In some aspects, the tray table 117 may include sliders or otherwise be a sliding tray table capable of forward and backward translation when deployed. In some examples, for example, the tray table 117 may be vertically adjusted to change its deployed height and be capable of sliding forward or backward at whatever height it is retained.

The system 101 may enable any suitable number of deployed heights for the support surface. For example, although FIG. 1 depicts three total heights (e.g., one initial height and two alternate heights), any suitable number of two or more heights may be provided.

Figure 2:
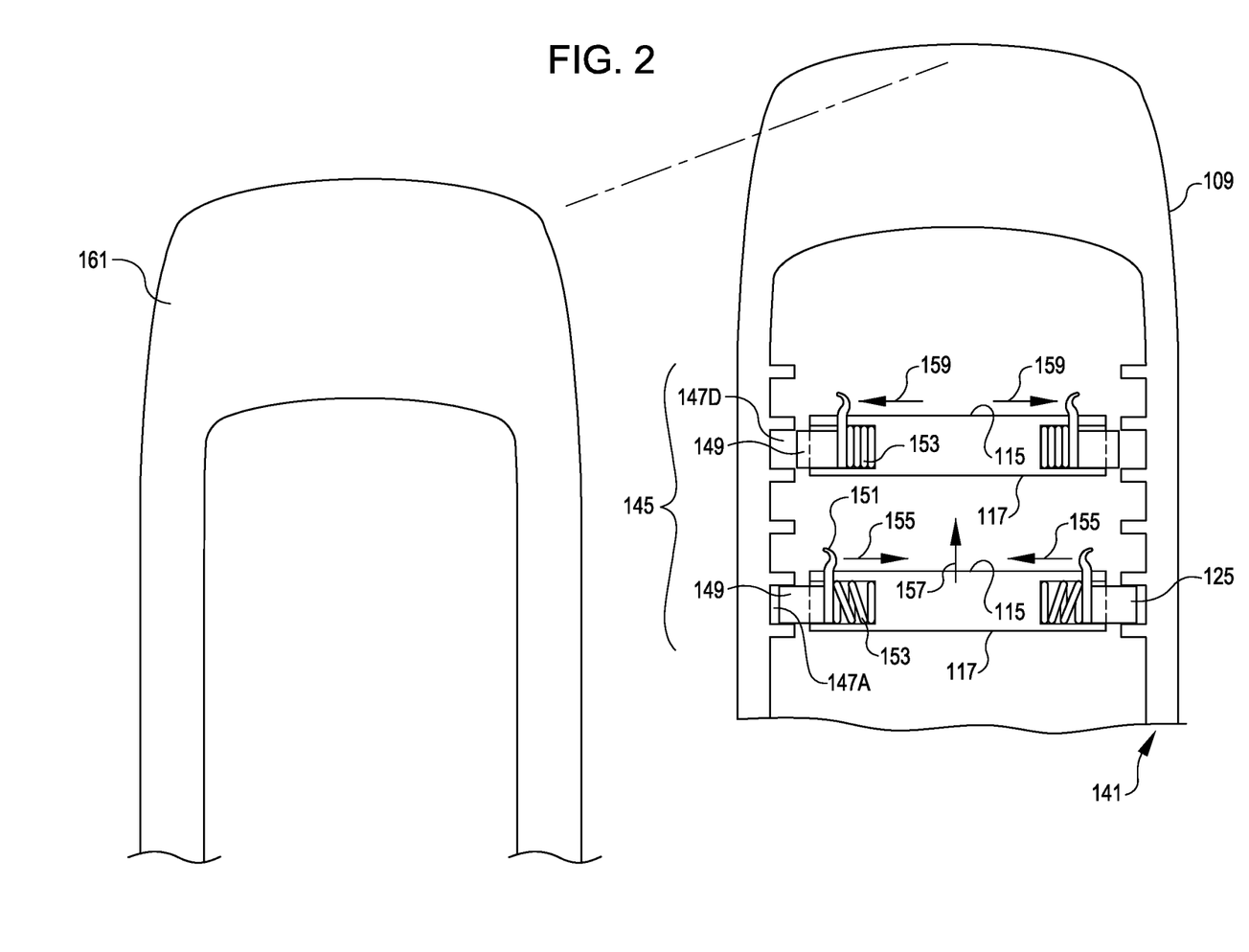
FIG. 2 is a partially exploded rear view of a passenger seat back with rungs that be utilized in the seat of FIG. 1.

FIG. 2 is a partially exploded rear view of the seat back 109 according to some examples. In FIG. 2, the seat back 109 includes a track 141, which may be coupled with the pivot 125. For example, the pivot 125 may be movable relative to the track 141 to adjust a deployed height of the support surface 115 and/or the tray table 117. The track 141 may include features that may retain the support surface 115 and/or the tray table 117 at respective different heights.

The track 141 may include rungs 145 that the pivot 125 may move among. Each rung 145 may correspond to a different level that the pivot 125 may move among. Each rung 145 may include suitable structure for releasably retaining the pivot 125 at a corresponding height. For example, in operation, height adjustment may include disengaging the pivot 125 from a first rung 145 that structurally retains the pivot at a first height and then engaging the pivot 125 with a second rung 145 that structurally retains the pivot 125 at a second height.

In FIG. 2, the rungs 145 include or are associated with recesses (such as recesses 147A and 147D). The pivot 125 may be associated with suitable features to releasably engage the recesses. For example, the pivot 125 may include or be coupled with a pin 149 that can be retracted by a lever, button, or other suitable actuator 151. The pin 149 may be biased by a spring or other biasing mechanism 153. In FIG. 2, such an arrangement is depicted on each side of the support surface 115, although in some examples, suitable operation may be achieved with one instance rather than two.

In operation, the pin 149 may be retracted (e.g., as at arrow 155) from a first recess that structurally retains the pivot 125 at a first height. This retraction, for example, may be in response to a passenger operating the actuator 151. The pivot 125 may be vertically moved (e.g., as at arrow 157), such as in response by lifting or lowering of the tray table 117 by the passenger. The vertical movement may align the pin 149 with another recess 147D at another height. The tray table 117 may be secured at this subsequent height by extending the pin 149 (e.g., as at arrow 159) into the second recess 147D, which may structurally retain the pivot 125 at the second height. The pin 149 may engage the second recess 147D in response to the passenger releasing or further actuating the actuator and/or under force provided by the biasing mechanism 153.

A shroud 161 is also shown in FIG. 2. In some examples, the pivot 125 may be inserted or otherwise installed into the track 141 prior to installation of the shroud 161. The shroud 161 once installed may provide a bounding structure that maintains the pivot 125 within the track 141 and prevents the pivot 125 from coming loose from the seat 103. In some examples, the track 141 is formed at least partially or completely within the shroud 161. Other arrangements are also possible. For example, although the track 141 has been described as facilitating vertical movement by interaction with pins 149 and actuators 151 with respect to FIG. 2, other structures may additionally or alternatively be incorporated into the track 141, shroud 161, and/or seat back 109.

The features described relative to FIG. 2 may be utilized with a seat back 109 that is fixed to prevent reclining. For example, the tray table 117 may be height adjustable in such case without concerns about a horizontal position of the tray table 117 being affected by a recline motion. In some examples, however, features described in relation to FIG. 2 may nevertheless be used in a seat back 109 that is reclinable.

Figure 3A:
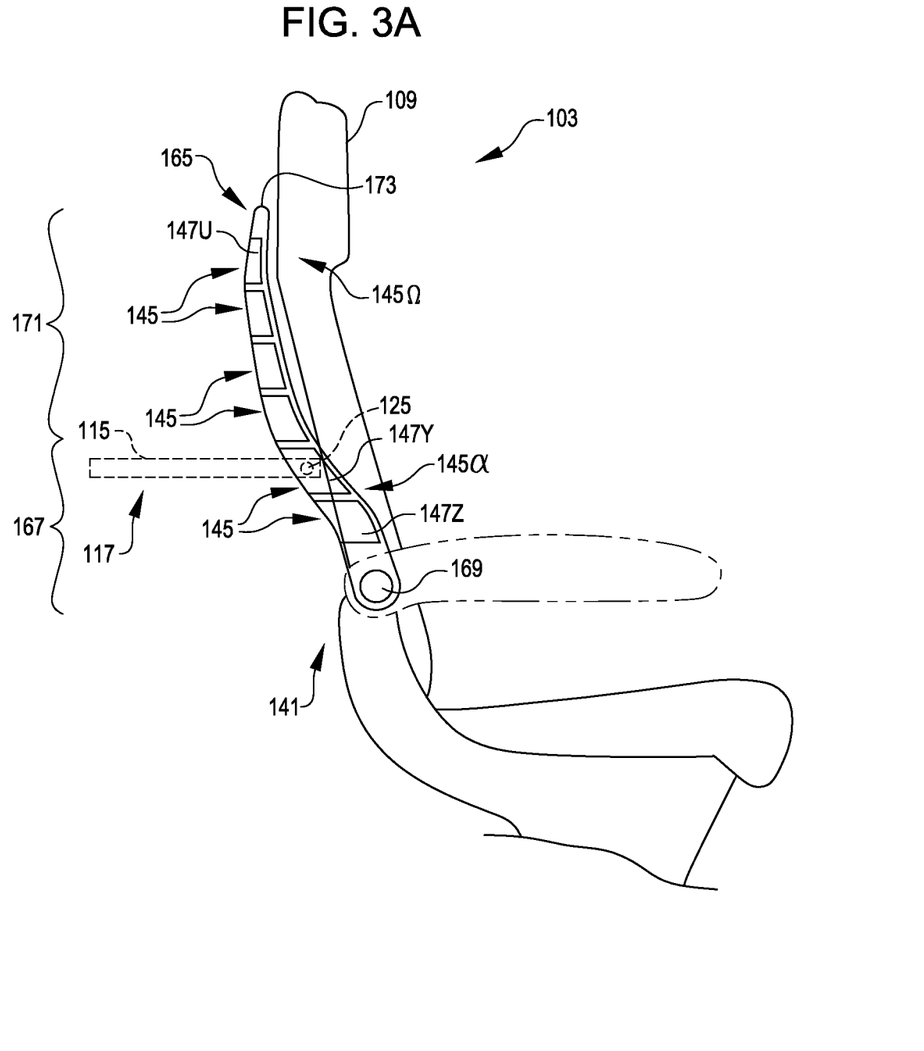
FIG. 3A is a side view of a passenger seat with a tray table arm having rungs that may be utilized in the seat of FIG. 1.

FIG. 3A is a side view the passenger seat 103 with an arm 165 according to some examples. The arm 165 may be a tray table arm. The arm 165 may include a track 141 with rungs 145 and/or recesses, e.g., akin to such features described with respect to FIG. 2.

The arm 165 can include a stock portion 167. The stock portion 167 may extend from a mounting interface 169 of the arm 165 to a first rung 145a that can support the pivot 125 at a first deployed height and/or in a stowed position. In some examples, the stock portion 167 may have a similar size and shape to commonly available tray table arms that extend no further than a joint with a corresponding tray table. In contrast, the arm 165 in FIG. 3A includes an extension portion 171. The extension portion 171 may extend from the first rung 145α to an extremity 173 of the arm 165 opposite the mounting interface 169. The extension portion 171 can include any number of rungs 145, e.g., including a final rung 145Ω for supporting the pivot 145 at an uppermost deployed height.

Figure 3B:
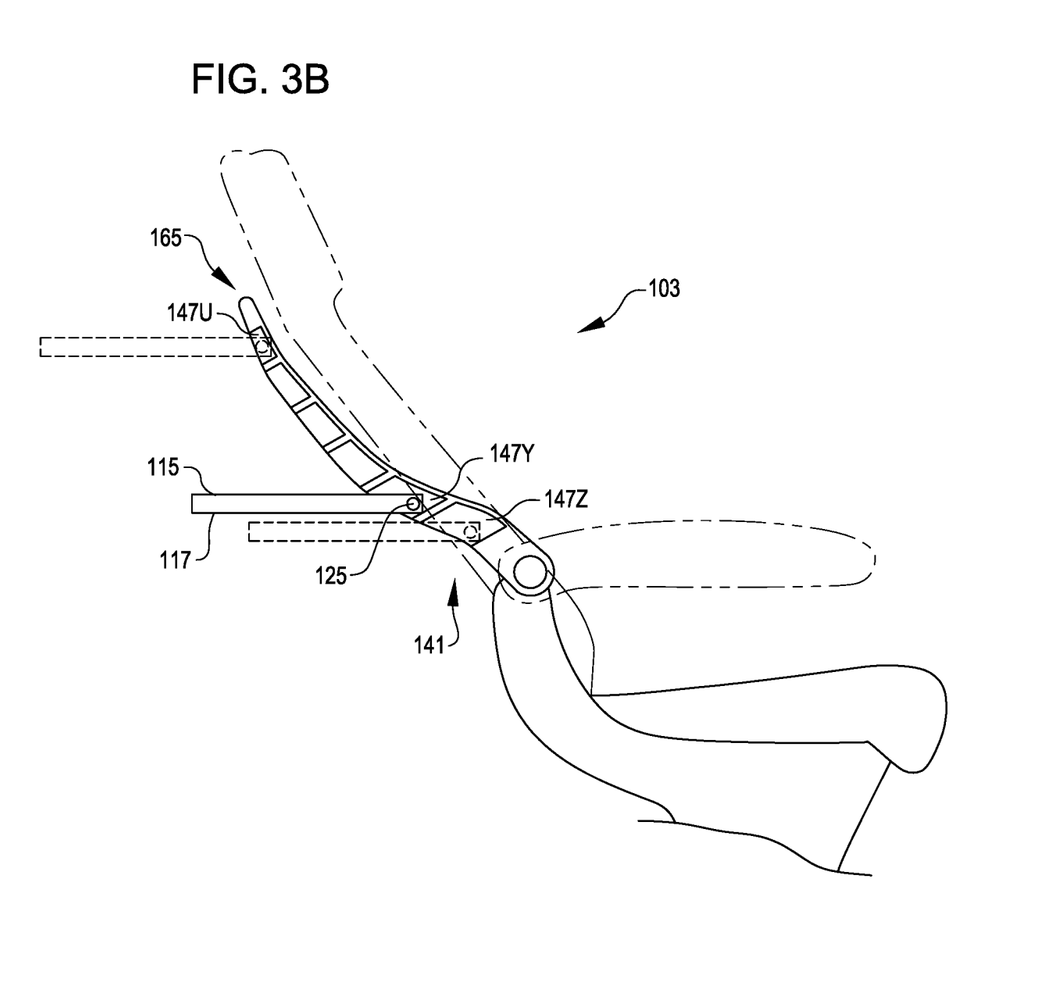
FIG. 3B is a side view of the passenger seat of FIG. 3A with various elements moved to other positions.

FIG. 3B is a side view of the seat 103 from FIG. 3A in a reclined position. The arm 165 has been pivoted rearward. As may be appreciated from FIG. 3B, the arm 165 may allow the support surface 115 and/or tray table 117 to be height-adjusted independent of a recline state of the seat 103. In operation, the pivot 125 may be moved among various recesses in the track 141 of the arm 165 to adjust the height, e.g., up or down. In some examples, such movement may be facilitated by pins 149 and actuators 151 as in FIG. 2, although other structures may additionally or alternatively be incorporated into the arm 165.

Figure 4:
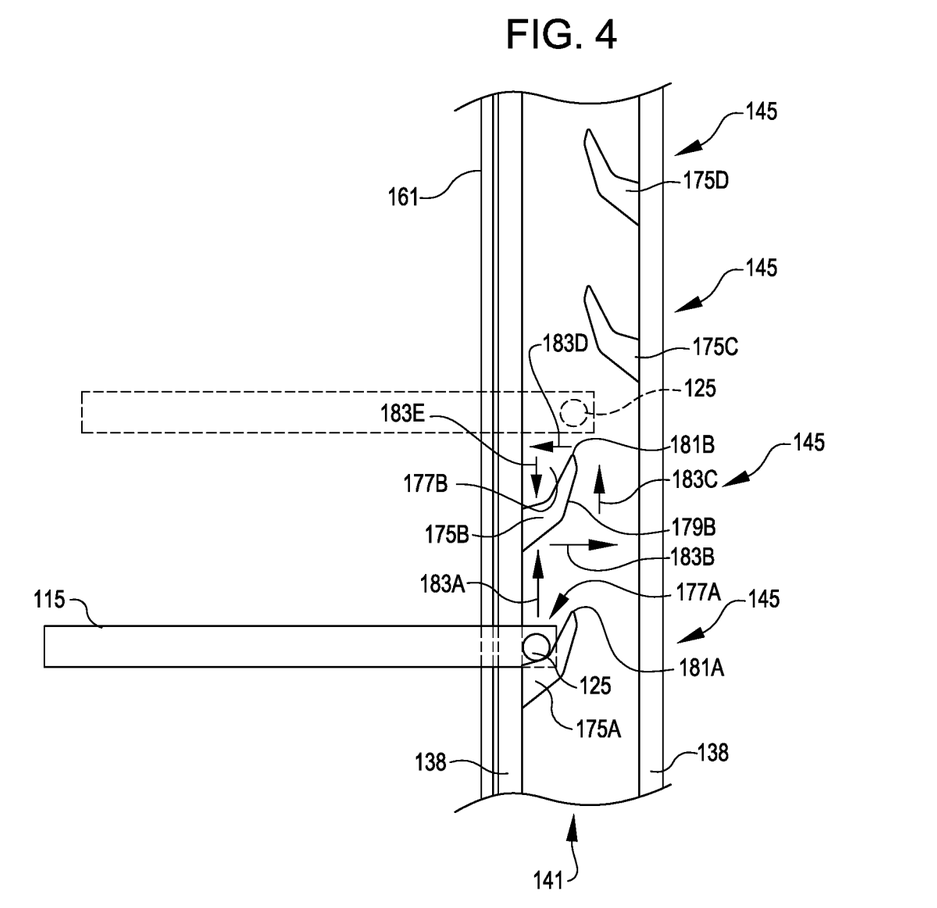
FIG. 4 is a side view of a track with prongs that may be may be utilized in the seat of FIG. 1.

FIG. 4 is a side view of a track 141 with prongs that may be may be utilized according to some examples. The prongs may be utilized within an arm 165 (e.g., similar to FIG. 3) and/or in a seat back 109 (e.g., similar to FIG. 2).

The prongs may correspond to respective rungs 145 among which the pivot 125 may move for adjusting height. The prongs may define notches, for example, between an inner face of a respective prong and a boundary of the track 141. The prongs may have ramped surfaces, for example, along an outer face of a respective prong. Lips, such as lip 181A or lip 181B, may also be included on the prongs and provide transitions between a corresponding notch and an upper end of the ramped surface and/or prong. Suitable rails 138 may be spaced apart from the prongs and/or rungs 145 to define gaps through which the pivot 125 is movable for moving between the prongs and/or rungs 145. For example, a prong may be mounted to one rail 138 and spaced apart from another rail 138 to prevent the pivot from escaping the track 141. In some aspects, the shroud 161 may be installed after the pivot 125 or otherwise couple with or incorporate a portion of the track 141 to retain the pivot 125 within the track 141.

In operation, the pivot 125 can be moved among the prongs to move among retained heights. The movements may be provided by the passenger holding onto the support surface 115 and imparting suitable movements. In use, moving among the prongs may include raising (e.g., as at arrow 183A) the pivot 125 out of a first notch 177A that structurally retains the pivot 125 at a first height. The movement may include translating the pivot 125 horizontally away from the first notch 177A (e.g., as at arrow 183B). The movement may include raising (e.g., as at arrow 183C) the pivot 125 along a ramped surface 179B (e.g., of an adjacent, second prong 175B) and past a lip 181B that defines a transition between an upper end of the ramped surface 179B and a second notch 177B. The movement may include translating the pivot 125 horizontally over the second prong 175B (e.g., as at arrow 183D). The movement may also include lowering (e.g., as at arrow 183E) the pivot 125 into the second notch 177B. The movement may cause the second notch 177B and/or the second prong 175B to structurally retain the pivot at the second height.

The movement of the pivot 125 may be generally reversed through the sequence just described to move the pivot 125 from the second prong 175B back down to the first prong 175A. In some examples, the pivot 125 may be moveable downward from an initial position in addition to or instead of upward.

The prongs may be arranged to extend either forward, aftward, or both. For example, in FIG. 4, the lower two prongs 175A and 175B are shown extending forward while upper two prongs 175C and 175D are shown extending aftward. Such an arrangement may allow a support surface 115 to be placed closer to the passenger at lower heights (e.g., so that as an eating surface, it may be closer to the passenger) and placed further from the passenger at upper heights (e.g., so that as platform for an entertainment device, it may be further from the passenger to give a sense of greater headroom). Other arrangements and corresponding rationales are also possible.

Figure 5A:
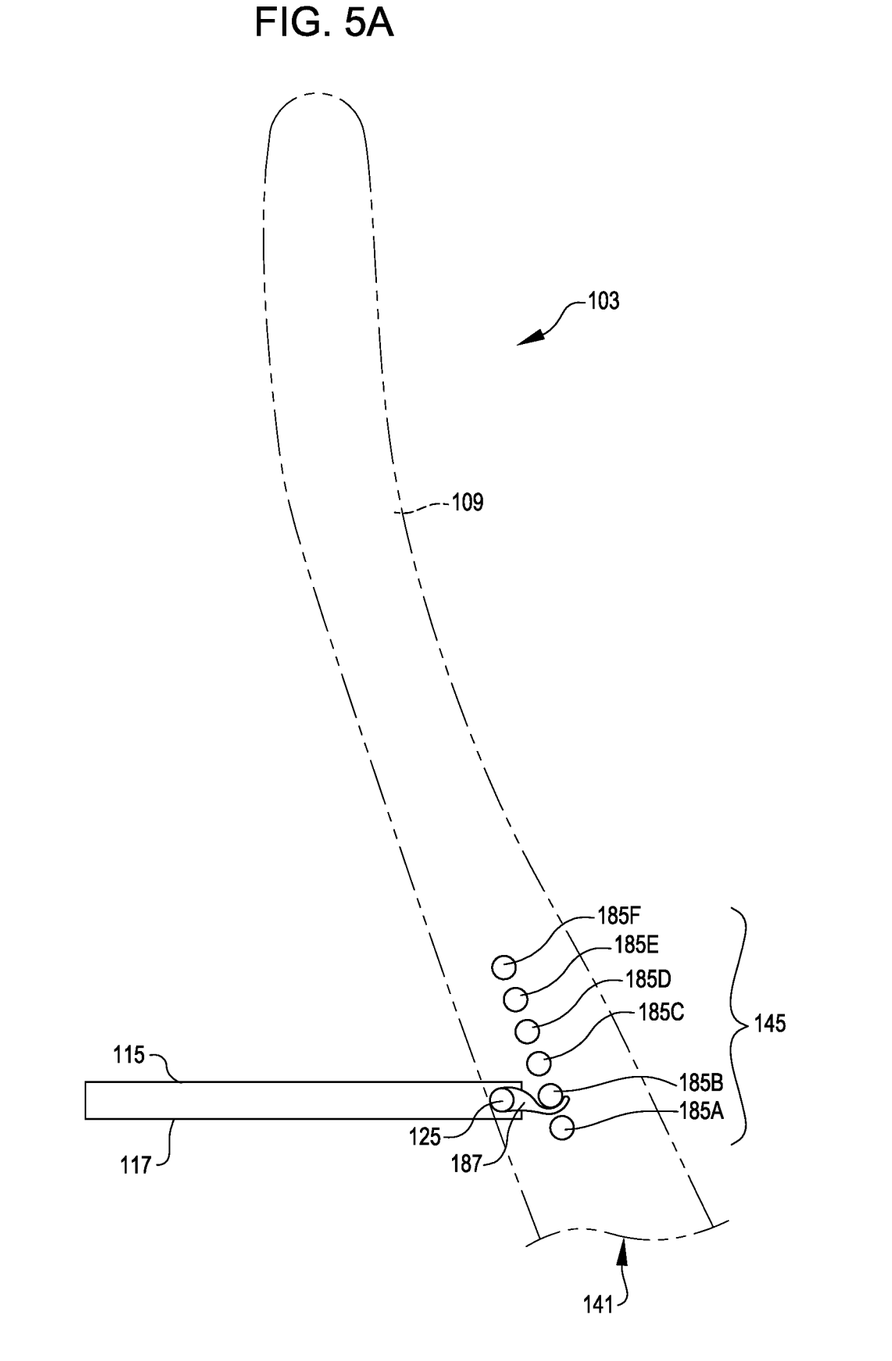
FIG. 5A is a side view of a track with pawls that may be may be utilized in the seat of FIG. 1.

FIG. 5A is a side view of a track 141 with pawls that may be may be utilized according to some examples. Although the pawls are shown as positioned within a seat back 109 (e.g., similar to FIG. 2), the pawls could additionally or alternatively be within an arm 165 (e.g., similar to FIG. 3).

The pawls may correspond to respective rungs 145 among which the pivot 125 may move for adjusting height. Although six pawls are shown, any suitable number of two or more may be used. The pawls may correspond to rods, pins, or other suitable structures for receiving a hook 187 coupled with lower end of the support surface 115 and/or tray table 117. In FIG. 5A, the hook 187 is received on a first pawl 185B to retain the pivot 125 at a first height.

Figure 5B:
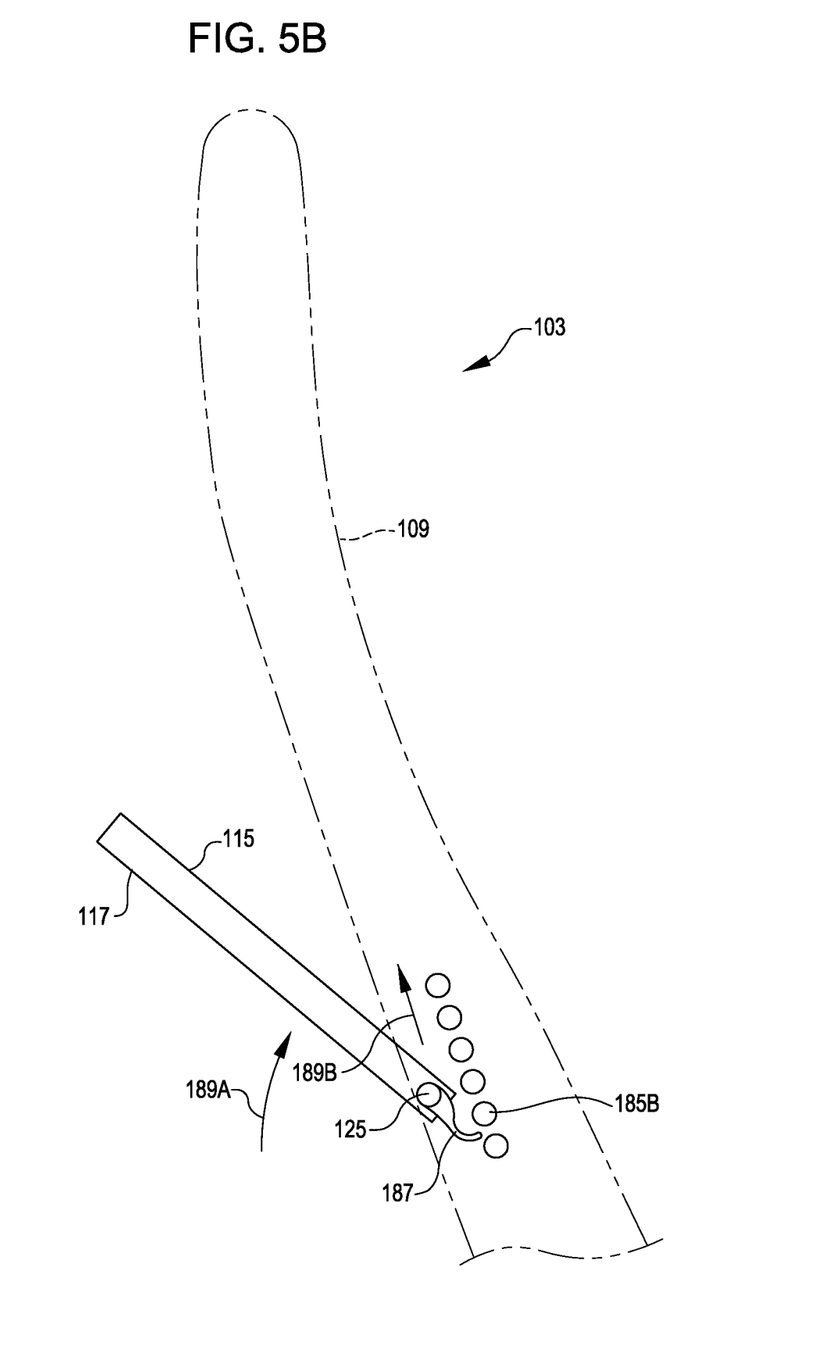
FIG. 5B is a side view of the track of FIG. 5A with various elements moved to other positions.

FIG. 5B shows the hook 187 disengaged. In operation, the hook 187 may become disengaged by a movement that includes tilting the support surface 115 or tray table 117 upward (e.g., as at arrow 189A). The movement may also include or be accompanied by vertically moving the pivot 125 (e.g., as at arrow 189B). Such movement may align the hook 187 with another pawl 185E, e.g., which may be above or below the original pawl 185B.

Figure 5C:
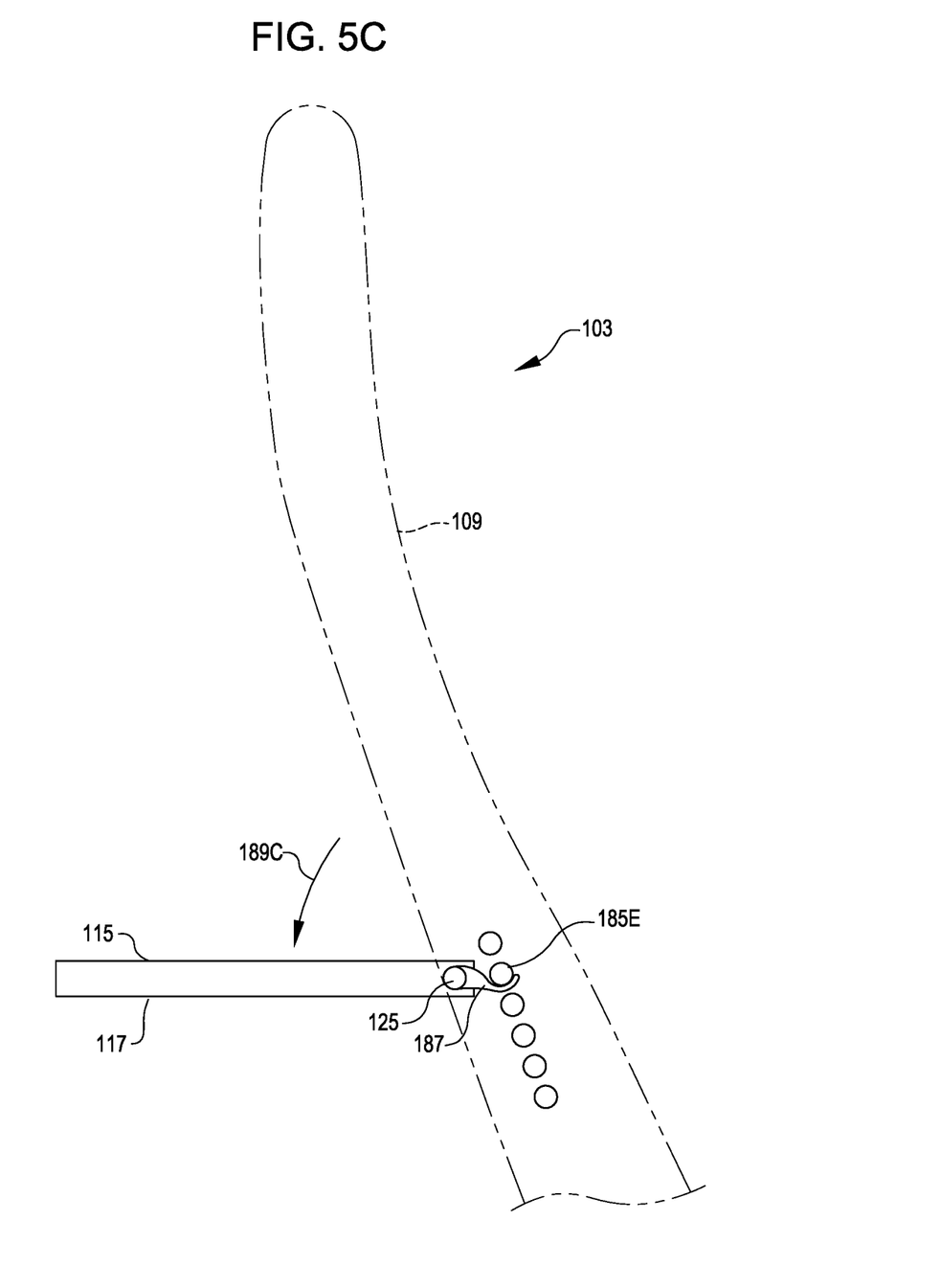
FIG. 5C is a side view of the track of FIGS. 5A-5B with various elements moved to further other positions.

FIG. 5C shows the hook 187 re-engaged with a different pawl 185E. Re-engagement may be accomplished by a movement that includes tilting (e.g., as at arrow 189C) the support surface 115 or tray table 117 downward to engage the hook 187 with the second pawl 185E. The second pawl 185E when engaged may structurally retain the pivot 125 at a second height.

In FIGS. 5A-5C, the pawls are shown spaced apart by an amount sized so that the hook will abut against adjacent pawls when supported. In some examples, respective pawls may be accompanied by intervening structure that supports the hook 187 from one side (e.g., underneath while the hook 187 engages the pawl on the other side).

Figure 6A:
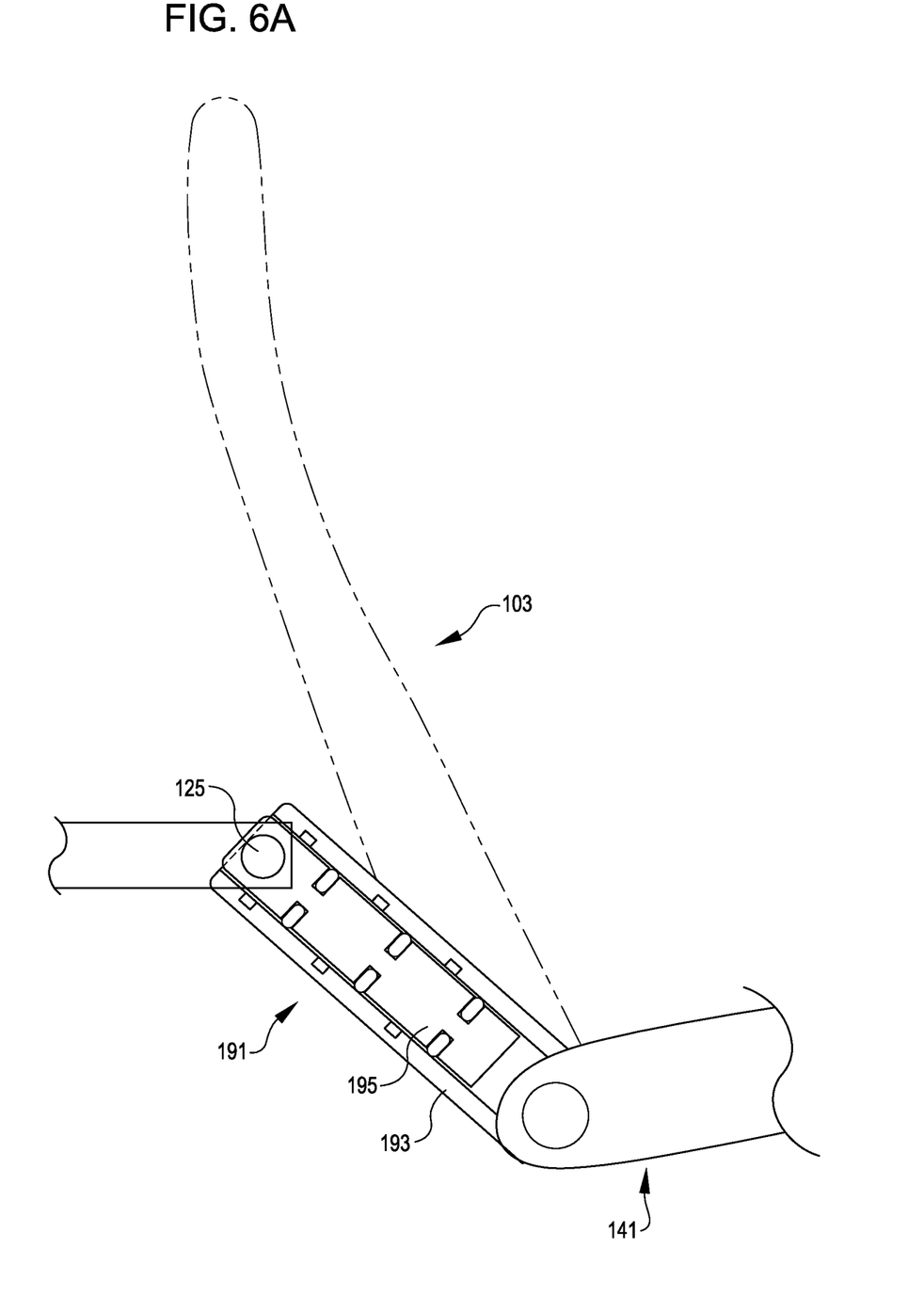
FIG. 6A is a side view of a passenger seat with a telescoping tray table arm that may be utilized in the seat of FIG. 1.

FIG. 6A is a side view of a track 141 incorporated into a telescoping arm 191 that may be used with the seat 103 according to some examples. The telescoping arm 191 may include a base member 193 and a sliding member 195. The sliding member 195 may slide relative to the base member 193. Although the sliding member 195 is shown within the base member 193 in FIG. 6A, the base member 193 could be arranged within the sliding member 195.

The sliding member 195 is secured to the pivot 125. This may allow movement of the sliding member 195 to impart movement to the pivot 125, for example, to cause the pivot 125 to move among different heights. For example, vertical movement may be imparted by extending or retracting the telescoping arm 191 in which the pivot 125 is mounted.

Figure 6B:
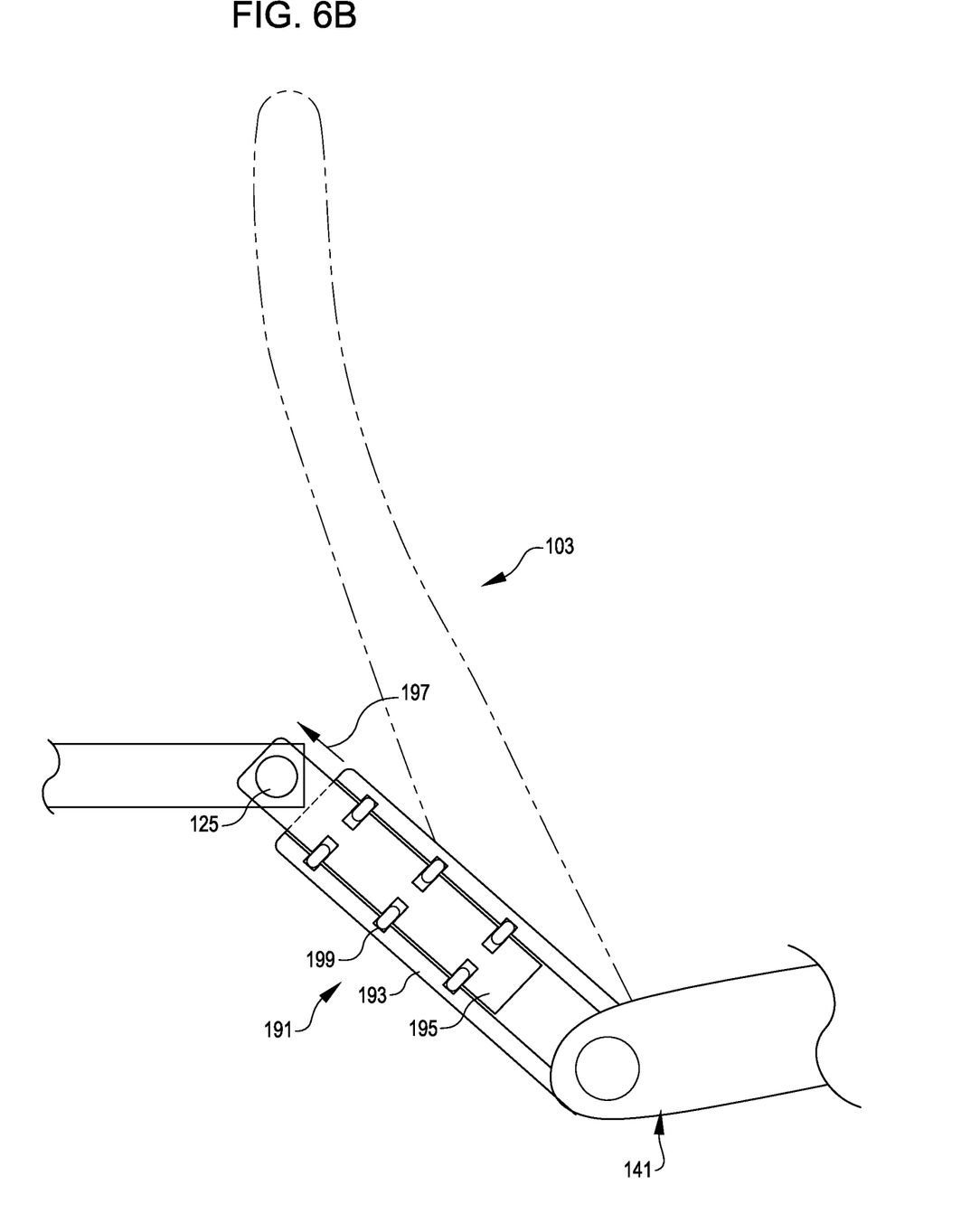
FIG. 6B is a side view of the passenger seat of FIG. 6A with various elements moved to other positions.

FIG. 6B is a side view of pivot 125 at a different height, e.g., resulting from a distal end of the sliding member 195 having moved away (as at arrow 197) from a distal end of the base member 193. The telescoping arm 191 may also include locking mechanisms 199 that may secure the relative position of the sliding member 195 relative to the base member 193 to retain the pivot 125 at a respective height. Suitable examples of the locking mechanisms 199 may include spring-loaded detents and corresponding grooves, or any other suitable releasable mechanism capable of releasably fixing moveable elements relative to one another.

In the following, further examples are described to facilitate the understanding of the invention:

Example 1 is a passenger seat, comprising: a seat back; a height-adjustable pivot adjustable between being retained at a first height relative to the seat back and being retained at a second height relative to the seat back; a support surface rotatable about the pivot and adjustable between: a stowed position along the seat back; a first deployed position in which the pivot is retained at the first height and the support surface is oriented for receiving and supporting items; and a second deployed position in which the pivot is retained at the second height and the support surface is oriented for receiving and supporting items.

Example 2 is the passenger seat of any of the preceding or subsequent examples, wherein the seat back is reclinable.

Example 3 is the passenger seat of any of the preceding or subsequent examples, wherein the seat back is fixed to prevent reclining.

Example 4 is the passenger seat of any of the preceding or subsequent examples, further comprising a pin releasably receivable among a first recess for retaining the pivot at the first height and a second recess for retaining the pivot at the second height.

Example 5 is the passenger seat of any of the preceding or subsequent examples, further comprising: a first prong defining a first notch for retaining the pivot at the first height; and a second prong positioned above the first prong and defining a second notch for retaining the pivot at the second height.

Example 6 is the passenger seat of any of the preceding or subsequent examples, wherein the first prong and the second prong extend aftward.

Example 7 is the passenger seat of any of the preceding or subsequent examples, wherein the first prong and the second prong extend forward.

Example 8 is the passenger seat of any of the preceding or subsequent examples, further comprising: a hook at a lower end of the tray table; a first pawl positioned to receive the hook to retain the pivot at the first height; and a second pawl positioned above the first pawl and positioned to receive the hook to retain the hook at the second height.

Example 9 is the passenger seat of any of the preceding or subsequent examples, further comprising a telescoping arm supporting the pivot and extendable or retractable to move the pivot between the first height and the second height.

Example 10 is a tray table assembly comprising: a tray table having a support surface; a pivot about which the support surface of the tray table is rotatable; and a track coupled with the pivot, wherein the pivot is movable relative to the track to adjust a deployed height of the tray table.

Example 11 is the tray table assembly of any of the preceding or subsequent examples, wherein the track is formed in a shroud configured to be coupled to a seat back.

Example 12 is the tray table assembly of any of the preceding or subsequent examples, wherein the track is formed in a tray table arm.

Example 13 is the tray table assembly of any of the preceding or subsequent examples, wherein the arm comprises: a stock portion extending from a mounting interface of the arm to a first rung for supporting the pivot at a first deployed height; and an extension portion extending from the first rung to an extremity of the arm opposite the mounting interface and comprising a final rung for supporting the pivot at an uppermost deployed height.

Example 14 is the tray table assembly of any of the preceding or subsequent examples, further comprising a rail spaced apart from rungs to define gaps through which the pivot is movable for moving between rungs.

Example 15 is a method, comprising: deploying a tray table from a stowed position along a seat back of a passenger seat and about a pivot of the tray table to a first deployed position in which the pivot of the tray table is structurally retained at a first height and a support surface of the tray table is oriented for receiving and supporting items; and vertically adjusting the tray table from the first deployed position to a second deployed position in which the pivot of the tray table is structurally retained at a second height different than the first height and the support surface of the tray table is oriented for receiving and supporting items.

Example 16 is the method of any of the preceding or subsequent examples, further comprising: disengaging the pivot from a first rung that structurally retains the pivot at the first height; and engaging the pivot with a second rung that structurally retains the pivot at the second height.

Example 17 is the method of any of the preceding or subsequent examples, further comprising: tilting the tray table upward to release a hook at a lower end of the tray table from a first pawl that structurally retains the pivot at the first height; vertically moving the pivot; and tilting the tray table downward to engage the hook with a second pawl that is at a different height from the first pawl and that structurally retains the pivot at the second height.

Example 18 is the method of any of the preceding or subsequent examples, further comprising: raising the pivot out of a first notch that structurally retains the pivot at the first height; and raising the pivot along a ramped surface and past a lip that defines a transition between an upper end of the ramped surface and a second notch; and lowering the pivot into the second notch to structurally retain the pivot at the second height.

Example 19 is the method of any of the preceding or subsequent examples, further comprising: retracting a pin from a first recess that structurally retains the pivot at the first height; vertically moving the pivot; and extending the pin into a second recess that structurally retains the pivot at the second height.

Example 20 is the method of any of the preceding or subsequent examples, wherein the vertically adjusting the tray table from the first deployed position to the second deployed position comprises extending or retracting a telescoping arm in which the pivot is mounted.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A tray table assembly comprising:
    a tray table having a support surface that is coupled with a hook extending outward therefrom and that is configured to engage with one or more pawls in a passenger seat to limit a range-of-motion of the support surface;
    a pivot pin about which the support surface of the tray table is rotatable, the pivot pin respectively extendable and retractable for respective receipt and removal relative to a first recess for retaining the pivot pin at a first height and a second recess for retaining the pivot pin at a second height; and
    a track defining the first recess and the second recess, wherein the pivot pin is movable relative to the track to adjust a deployed height of the tray table.

2. The tray table assembly of claim 1, further comprising an actuator operable to cause at least one of retraction or extension of the pivot pin for movement of the pivot pin among the first recess and the second recess.

3. The tray table assembly of claim 1, wherein the track is formed in a shroud configured to be coupled to a seat back.

4. The tray table assembly of claim 1, wherein the track is formed in a tray table arm.

5. The tray table assembly of claim 4, wherein the arm comprises:
    a stock portion extending from a mounting interface of the arm to a first rung for supporting the pivot at a first deployed height; and
    an extension portion extending from the first rung to an extremity of the arm opposite the mounting interface and comprising a final rung for supporting the pivot at an uppermost deployed height.

6. The tray table assembly of claim 1, further comprising a seat back of a passenger seat, wherein the first height and the second height are relative to the seat back so that the pivot pin is height adjustable along the seat back.

7. A passenger seat, comprising:
    a seat back comprising a set of pawls arranged vertically offset from one another;
    a height-adjustable pivot pin adjustable between being retained at a first height relative to the seat back and being retained at a second height relative to the seat back, the pivot pin respectively extendable and retractable for respective receipt and removal relative to a first recess for retaining the pivot at the first height and a second recess for retaining the pivot at the second height;
    a support surface comprising a hook extending outward therefrom to engage with one or more pawls of the set of pawls to limit a range-of-motion of the support surface, the support surface rotatable about the pivot pin and adjustable between:
        a stowed position along the seat back;
        a first deployed position in which the pivot pin is retained at the first height and the support surface is oriented for receiving and supporting items; and
        a second deployed position in which the pivot pin is retained at the second height and the support surface is oriented for receiving and supporting items.

8. The passenger seat of claim 7, wherein the seat back is reclinable.

9. The passenger seat of claim 7, wherein the seat back is fixed to prevent reclining.

10. A method, comprising:
    deploying a tray table from a stowed position along a seat back of a passenger seat and about a pivot pin of the tray table to a first deployed position in which the pivot pin of the tray table is structurally retained in a first recess at a first height and in which a support surface of the tray table is oriented for receiving and supporting items;
    engaging a hook of the support surface with one or more pawls in a passenger seat to limit a range-of-motion of the support surface, the hook extending outward from support surface;
    retracting the pivot pin from the first recess; and
    vertically adjusting the tray table from the first deployed position to a second deployed position in which the pivot pin of the tray table is extendable into a second recess to be structurally retained at a second height different than the first height and in which the support surface of the tray table is oriented for receiving and supporting items.

11. The method of claim 10, further comprising:
    extending the pivot pin into the second recess to structurally retain the pivot at the second height.

* * * * *